Patented Mar. 26, 1935

1,995,612

UNITED STATES PATENT OFFICE 1,995,612

MERCAPTAN PURIFICATION

John R. Huffman, Elizabeth, and James M. Whiteley, Jr., Roselle, N. J., assignors to Standard Oil Development Company, a corporation of Delaware No Drawing. Application May 3, 1932, Serial No. 609,028

13 Claims. (Cl. 260—156)

This invention relates to the purification of mercaptans with especial reference to the use of the purified mercaptans in catalytic conversion processes such as described in co-pending application Ser. No. 603,922 filed April 8, 1932 by Frolich and Wiezevich.

It has been observed that when a mercaptan, especially if derived from mineral oils, is used as a feed stock in catalytic processes such as for conversion to thio-ethers, disulfides, higher mercaptans, thio-aldehydes, thio-esters, or other organic compounds, the activity of the catalyst decreases rapidly. This catalyst deterioration has been observed even with a closely cut redistilled fraction consisting substantially of only ethyl mercaptan. It has now been found that the catalyst deterioration may be avoided if the mercaptan feed stock is subjected to a pretreatment adapted to remove catalyst poisons therefrom. The mercaptan feed stock may be purified by contact with a purifying mass such as activated charcoal, decolorizing clay, fresh or spent catalyst from a mercaptan conversion process, or other suitable substances of adsorptive and/or polymerizing characteristics. Such catalysts will be described hereinafter. The correct temperature for this pretreatment or purification step depends largely upon the nature and activity of the purifying agent selected. With charcoal, clay and mercaptan conversion catalysts, the preferred temperature range is about 250 to 400° C., although higher or lower temperatures may be used, say 200 to 600° C., depending upon the adsorptive and polymerizing activity of the purifying mass and the time permitted for contact. An appreciable conversion of mercaptan to thio-ether and other organic sulfur compounds may be secured during the purification step and is especially noted in the higher temperature range. It is preferable to use a temperature and time of contact at which such conversion is not material, say below about 5 or 10%.

The purity of the mercaptan may be further increased by the removal of condensation and polymerization products formed during the pretreatment. This may be done by an intermediate condensation and redistillation process, by partial condensation preferably under rectifying conditions at a temperature slightly above the end point of the original mercaptan fraction being treated, or by other suitable means adapted to remove constituents of higher boiling point than the original mercaptans. This intermediate removal of higher boiling constituents formed in the purification step may be rendered more effective by using as a feed stock a mercaptan fraction of comparatively narrow boiling range. For example, fractions boiling below 25° C., from 25 to 50° C., and from 50 to 75° C., etc. may be used to advantage. Chemical means such as those used for separating unconverted mercaptans from the products of the mercaptan conversion process, may also be used.

This invention will be understood from the following illustrative examples:

1. Pure ethyl mercaptan prepared synthetically was passed at 400° C. over a catalyst containing 90% cadmium sulfide, 5% zinc sulfide and 5% alumina. The activity of the catalyst was substantially constant. The conversion of mercaptan to thio-ether varied between 40 and 45% for a period of 16 hours of constant operation.

2. A fraction of mercaptan boiling between 25 and 50° C. and obtained by refractionation of the mercaptan distillate obtained by steam distillation of a spent aqueous solution of caustic soda used for scrubbing sour cracked petroleum naphtha, was passed over the same catalyst and under the same operating conditions described in Example 1. The conversion of mercaptan to thio-ether was initially 45% but the catalyst rapidly decreased in activity and after 25 to 35 hours the conversion was less than 30% and continued to decrease.

3. The same mercaptan fraction used in Example 2 was passed over activated charcoal at 250° C. and was then condensed and redistilled. The distillate boiling below 50° C. was then passed over a catalyst of the same composition and under the same operating conditions used in Example 1. The conversion of mercaptan to thio-ether decreased from 45 to 40% in two hours and remained constant at 40% for sixteen hours at which time the run was stopped.

4. Mercaptan from the same fraction used in Example 2 was passed over activated charcoal at 250° C. then through a partial condenser at 45° C. and the uncondensed fraction was then passed over the same catalyst and under the same operating conditions described in Example 1. The conversion of mercaptan to thio-ether was constant at 48% for twenty-four hours. The activated charcoal purifying mass used in the above examples gradually loses its power for removing catalytic poisons and may be reactivated from time to time by passing superheated steam or inert gas or air over it at elevated temperatures. Other purifying masses such as clay and spent mercaptan conversion catalysts also show losses in purifying power and may be reactivated in like manner.

Other purifying methods such as scrubbing of the mercaptan in liquid phase with sulfuric acid, zinc chloride solution, triethanolamine, or contact with aluminum chloride, may be used. The exact composition of the poisons has not been determined but it is suggested in explanation that these poisons consist of highly reactive and readily polymerizable substances such as diolefines, which unless removed may undergo polymerization during the mercaptan conversion process and deposit highly polymerized or carbonaceous substances on the catalyst, thereby impairing its activity.

These methods may be used for the purification of either pure or mixed mercaptans prepared by substantially any means. Sulfur-bearing mineral oils, naturally occurring carbonaceous materials and the extraction, conversion, and distillation products of both provide the most readily available sources of mercaptans. These mercaptans may be recovered by various known refining methods as by treatment with lead acetate or caustic soda solutions or other alkaline agents. Aqueous caustic soda is especially suitable for removing relatively low molecular weight mercaptans from petroleum naphthas. By washing such naphthas with an aqueous solution of caustic soda there is extracted from the oil a mixture consisting primarily of methyl, ethyl, propyl and butyl mercaptides. Heavier mercaptides remain in the naphtha and may be recovered as a residue by careful distillation. The lower mercaptans may be recovered from the aqueous alkali solution by acidulation, steam distillation or other suitable means.

As examples of catalytic conversion processes for which purified mercaptans are suitable feed stocks may be mentioned that described in the co-pending application Ser. No. 603,922 filed April 8, 1932, by Frolich and Wiezevich. According to this process the mercaptan is passed, preferably in vapor form, over suitable catalysts under suitable reaction conditions of temperature and pressure to favor the desired reactions which may involve dehydrogenation or splitting out of hydrogen sulfide, or both. Hydrogen, hydrogen sulfide and olefines may be added as aids in controlling the reaction conditions and in suppressing the reactions not desired. Carbon monoxide, water vapor, air and other oxygen-containing or oxidizing gases may also be added and are of advantage in the preparation of sulf-oxy-organic and oxy-organic products.

A similar process especially suited for the conversion of mercaptan to thio-ether, in which the mercaptan is passed over a suitable catalyst at a reaction temperature below about 500° C., the product is cooled, hydrogen sulfide is removed from the uncondensed gases and the residual gas, containing olefines, is recirculated with added mercaptan over the catalyst, is shown in United States application Ser. No. 583,787, filed December 29, 1931, by William Seaman.

Substantially all metallic sulfides are shown to be suitable catalysts for the conversion of mercaptan in the co-pending application Ser. No. 585,156, filed January 6, 1932, by Seaman and Huffman.

Similar catalysts of increased activity and stability in the conversion of mercaptans are described in the co-pending application Ser. No. 605,783 filed April 16, 1932, by Per K. Frolich. Such catalysts consist of a metallic sulfide in combination with a suitable promotor which may consist of a sulfide of another metal, an oxide, carbonate, or other compound of the metals of the II, III, VI and VII groups of elements, or porous or refractory supports such as activated charcoal, silica gel, alumina, bauxite, and refractory oxides of chromium and magnesium.

This invention is not to be limited to any theory of the operation of the herein described process, nor to any examples which are given solely for purpose of illustration, but only by the following claims in which we wish to claim all novelty insofar as the prior art permits.

We claim:

1. An improved method for removing catalyst poisons from a mercaptan comprising contacting the mercaptan with a solid adsorptive and polymerizing agent at a temperature between the approximate limits of 200° C. and 600° C.

2. An improved method for removing catalyst poisons from a mercaptan comprising contacting the mercaptan with a solid adsorptive and polymerizing agent at a temperature between the approximate limits of 200° C. and 600° C. and removing reaction products formed by such contact.

3. An improved method for removing catalyst poisons from a mercaptan comprising contacting the mercaptan with a solid adsorptive and polymerizing agent at a temperature between the approximate limits of 200° C. and 600° C. and removing higher boiling reaction products formed by such contact.

4. An improved method for removing catalyst poisons from a mercaptan comprising contacting the mercaptan with a solid adsorptive and polymerizing agent at a temperature between the approximate limits of 200° C. and 600° C. and subsequently removing by rectification higher boiling reaction products formed by such contact.

5. An improved process for removing catalyst poisons from mercaptans derived from petroleum hydrocarbons comprising contacting the mercaptans with a solid adsorptive and polymerizing agent at a temperature between the approximate limits of 200° C. and 600° C., and removing reaction products of less volatility than said mercaptans.

6. An improved method for removing catalyst poisons from a fraction of mercaptans boiling within a range of about 25° C. derived from petroleum oils by absorption with an aqueous alkali comprising passing said mercaptan fraction at a temperature between about 200 and 600° C. over a solid adsorptive and polymerizing agent, and removing the reaction products of less volatility than said mercaptan fraction.

7. An improved method for removing catalyst poisons from a fraction of mercaptans boiling within a range of about 25° C. derived from petroleum oils by absorption with an aqueous alkali comprising passing said mercaptan fraction at a temperature between about 250 to 400° C. over a solid adsorptive and polymerizing agent, and removing the reaction products of less volatility than said mercaptan fraction.

8. In the catalytic conversion of a mixture of mercaptans derived from petroleum to thio-ethers and other organic sulfur compounds, an improved method for avoiding catalyst poisoning comprising first passing the said mixture of mercaptans in vapor form over an active solid adsorptive and polymerizing agent at an elevated temperature sufficient to cause polymerization of impurities but insufficient to cause material conversion of mercaptan, removing condensation products and subjecting the purified said mixture of mercaptans to the catalytic conversion process.

9. In a process for the catalytic conversion of mercaptans derived from petroleum hydrocarbons to thio-ethers and other organic sulfur compounds, an improved method of removing catalyst poisons from said mercaptan comprising passing the mercaptan over a solid adsorbtive and polymerizing agent, at a temperature of about 200 to 600° C., then cooling the mercaptan to a temperature slightly above its boiling point to condense higher boiling reaction products, separately removing such products and subjecting the remaining purified mercaptan to the catalytic conversion process.

10. Process according to claim 9 in which the mercaptan is passed over the adsorptive agent at a temperature of about 250 to 400° C.

11. Process according to claim 9 in which said agent is charcoal.

12. The process of purifying mercaptans comprising contacting said mercaptans with a solid adsorptive and polymerizing agent at a temperature between the approximate limits of 200° C. and 600° C.

13. Process according to claim 12 in which said agent is charcoal.

JOHN R. HUFFMAN.
JAMES M. WHITELEY, Jr.